United States Patent
Hori et al.

(10) Patent No.: US 11,334,058 B2
(45) Date of Patent: May 17, 2022

(54) PLANT DATA CLASSIFICATION DEVICE, PLANT DATA DISPLAY PROCESSING DEVICE, AND PLANT CONTROL SYSTEM

(71) Applicant: HITACHI, LTD., Tokyo (JP)

(72) Inventors: Yoshinari Hori, Tokyo (JP); Hiroki Yamamoto, Tokyo (JP); Masaaki Mukaide, Tokyo (JP)

(73) Assignee: HITACHI, LTD., Tokyo (JP)

( * ) Notice: Subject to any disclaimer, the term of this patent is extended or adjusted under 35 U.S.C. 154(b) by 384 days.

(21) Appl. No.: 16/489,244

(22) PCT Filed: Oct. 5, 2017

(86) PCT No.: PCT/JP2017/036227
§ 371 (c)(1),
(2) Date: Aug. 27, 2019

(87) PCT Pub. No.: WO2018/163488
PCT Pub. Date: Sep. 13, 2018

(65) Prior Publication Data
US 2020/0012269 A1    Jan. 9, 2020

(30) Foreign Application Priority Data

Mar. 8, 2017    (JP)    JP2017-043821

(51) Int. Cl.
*G05B 23/02*    (2006.01)
*G06K 9/62*    (2022.01)

(52) U.S. Cl.
CPC ....... *G05B 23/024* (2013.01); *G05B 23/0235* (2013.01); *G06K 9/6262* (2013.01); *G06K 9/6267* (2013.01)

(58) Field of Classification Search
CPC .............. G05B 23/024; G05B 23/0235; G05B 23/0221; G06K 9/6262; G06K 9/6267;
(Continued)

(56) References Cited

U.S. PATENT DOCUMENTS 5,347,446 A * 9/1994 Iino ...................... G05B 13/048
700/44
5,566,273 A * 10/1996 Huang ................. G06K 9/6222
706/28
(Continued)

FOREIGN PATENT DOCUMENTS

JP    H11338848 A    12/1999
JP    2007-156881 A    6/2007
(Continued)

OTHER PUBLICATIONS

International Search Report for related International Application No. PCT/JP2017/036227, dated Dec. 19, 2017; 1 page.

*Primary Examiner* — Mohammad K Islam
(74) *Attorney, Agent, or Firm* — Procopio, Cory, Hargreaves & Savitch LLP

(57) ABSTRACT

A plant data classification device according to one aspect of the invention includes: a data classification unit that classifies multidimensional operation data into categories; an evaluation index calculation unit that calculates an evaluation index of a category from a value of the operation data; a classification result evaluation unit that calculates a variation in the evaluation index for each category and determines whether the variation in the evaluation index is less than or equal to a reference value; and a parameter changing unit that changes, when it is determined that the variation in the evaluation index exceeds the reference value, a value of a parameter that defines a size of a category of the data classification unit in a direction of decreasing the size of the category.

8 Claims, 15 Drawing Sheets

| CATEGORY NUMBER | NUMBER OF DATA | EVALUATION INDEX | |
|---|---|---|---|
| | | AVERAGE VALUE | VARIATION |
| 1 | 10 | 0.925 | 0.028 |
| 2 | 12 | 0.968 | 0.025 |
| 3 | 23 | 0.936 | 0.018 |
| 4 | 12 | 0.975 | 0.025 |
| 5 | 8 | 0.972 | 0.018 |
| 6 | 25 | 0.952 | 0.021 |
| : | : | : | : |

W2

(58) Field of Classification Search
CPC .. G06K 9/6222; G06K 9/00536; Y02P 90/30; G06Q 10/04; G06Q 50/04
See application file for complete search history.

(56) References Cited

U.S. PATENT DOCUMENTS

| | | | |
|---|---|---|---|
| 2005/0209767 A1* | 9/2005 | Kim | G05B 23/024 |
| | | | 701/100 |
| 2014/0249655 A1* | 9/2014 | Nystrom | G05B 23/0297 |
| | | | 700/32 |
| 2015/0039652 A1* | 2/2015 | Kapoustin | G06Q 10/0631 |
| | | | 707/779 |

FOREIGN PATENT DOCUMENTS

| | | |
|---|---|---|
| JP | 2010-237893 A | 10/2010 |
| JP | 2015-100766 A | 6/2015 |
| JP | 2016-033778 A | 3/2016 |

* cited by examiner

[FIG. 1]
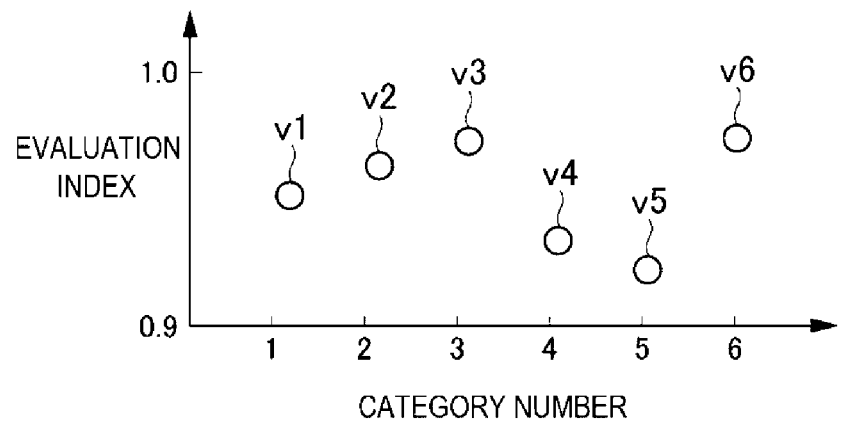
[FIG. 2]
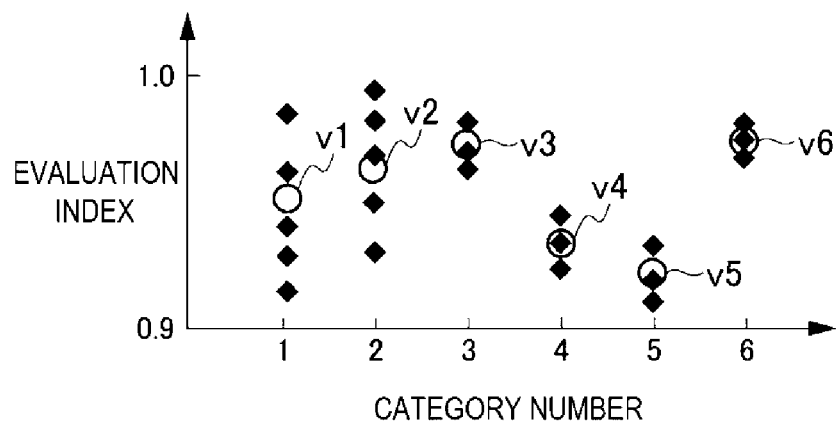

[FIG. 3]
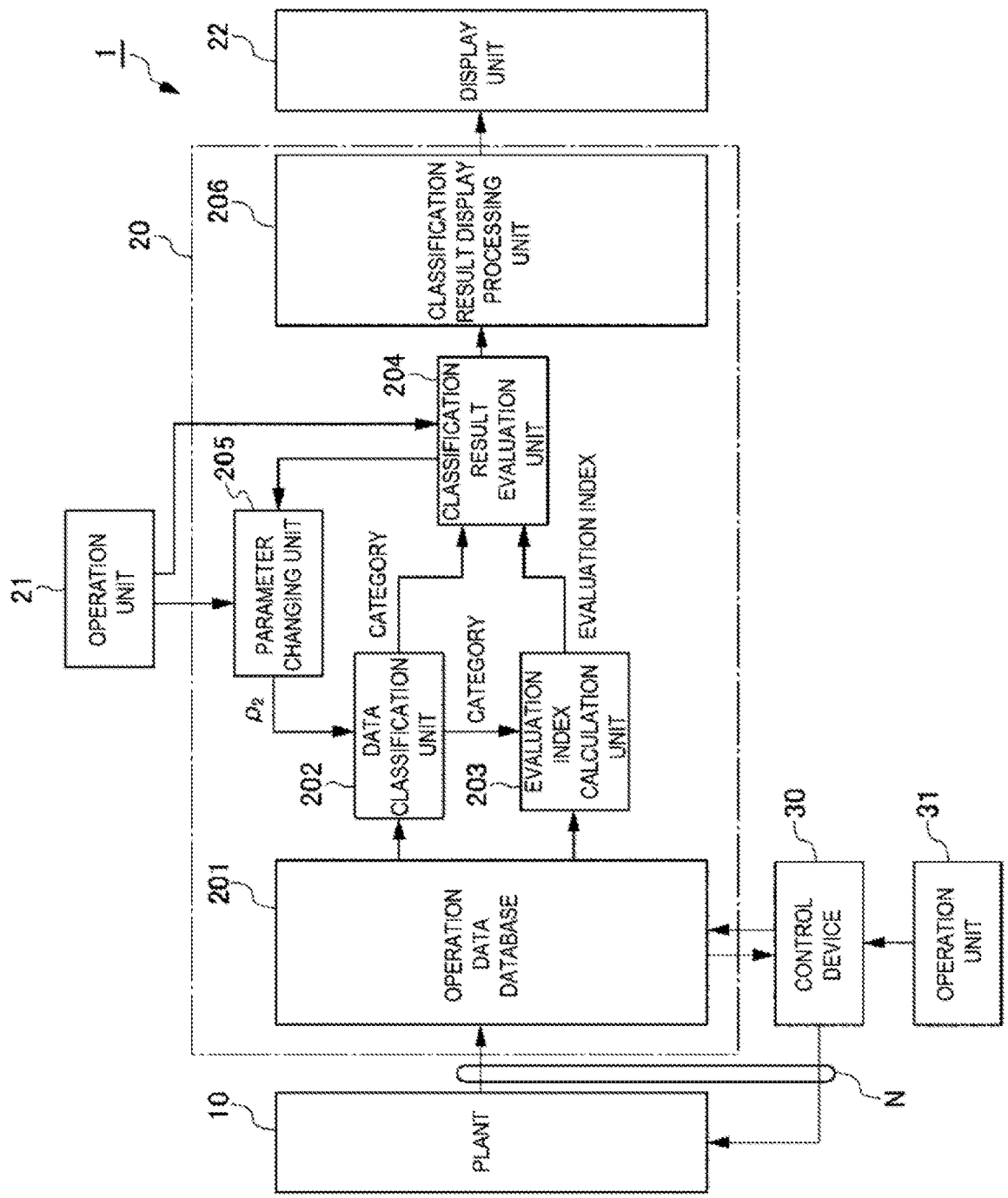

[FIG. 4]
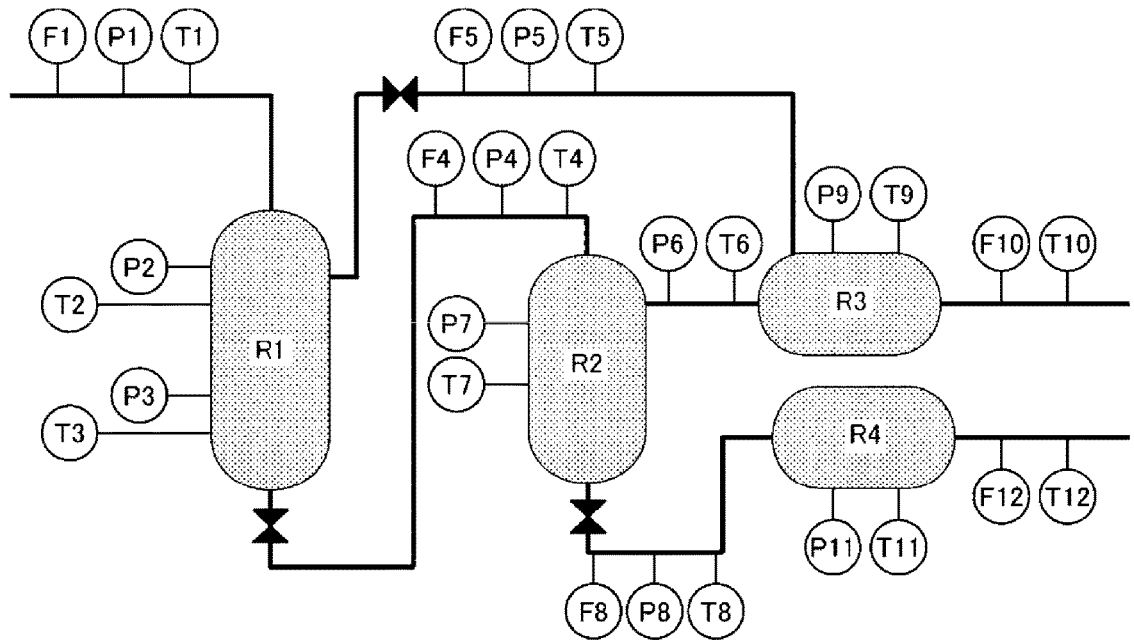
[FIG. 5]
| | F1 | P1 | T1 | ... | F12 | ... |
|---|---|---|---|---|---|---|
| DATE AND TIME | INLET FLOW RATE OF FIRST REACTOR | INLET PRESSURE OF FIRST REACTOR | INLET TEMPERATURE OF FIRST REACTOR | ... | OUTLET FLOW RATE OF FOURTH REACTOR | ... |
| 2016/3/3 10:01:00 | 3.20 | 0.35 | 158.1 | | 1.53 | |
| 2016/3/3 10:02:00 | 3.21 | 0.34 | 156.2 | | 1.54 | |
| 2016/3/3 10:03:00 | 3.18 | 0.35 | 156.8 | | 1.52 | |
| : | : | : | : | | : | |
201a

[FIG. 6]
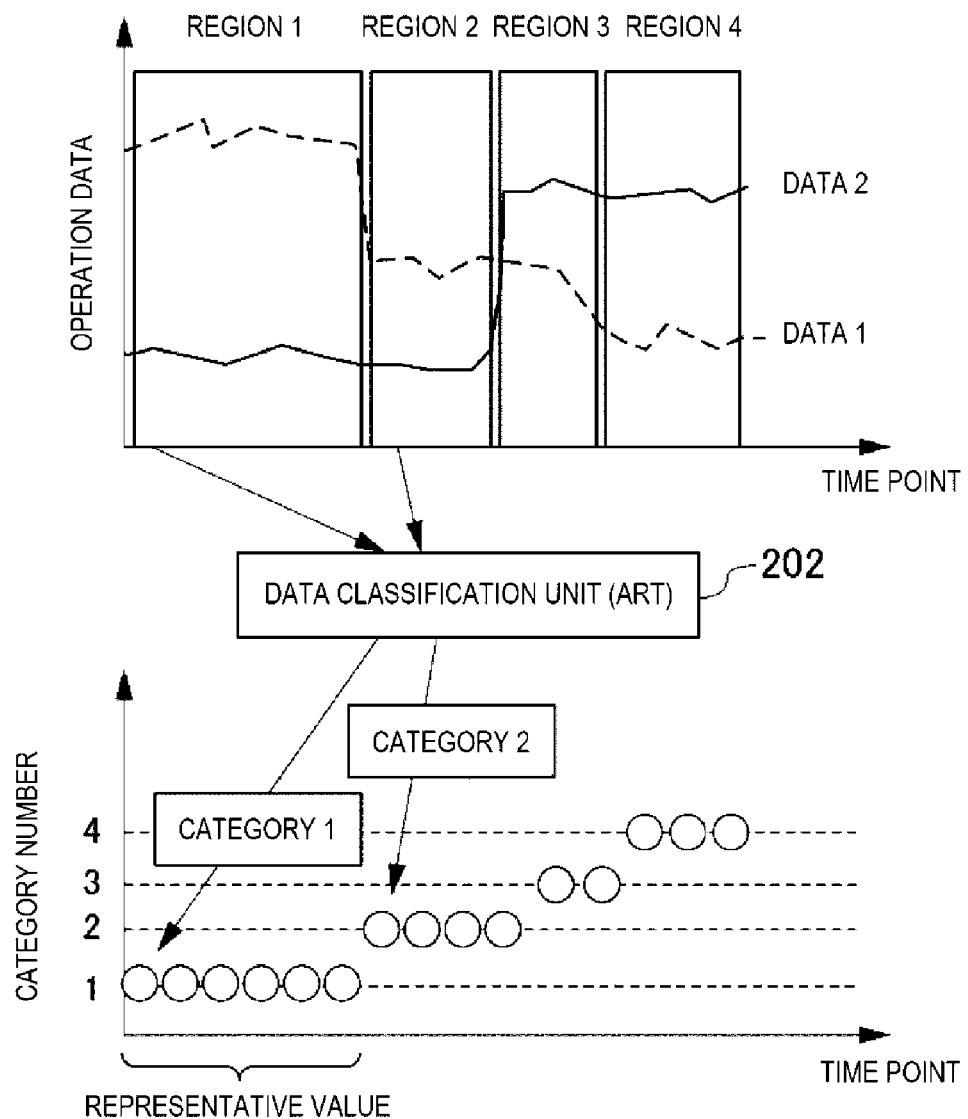

[FIG. 7]
| DATE AND TIME | EVALUATION INDEX (YIELD) |
|---|---|
| 2016/3/3 10:01:00 | 0.92 |
| 2016/3/3 10:02:00 | 0.93 |
| 2016/3/3 10:03:00 | 0.94 |
| : | : |
203a
[FIG. 8]
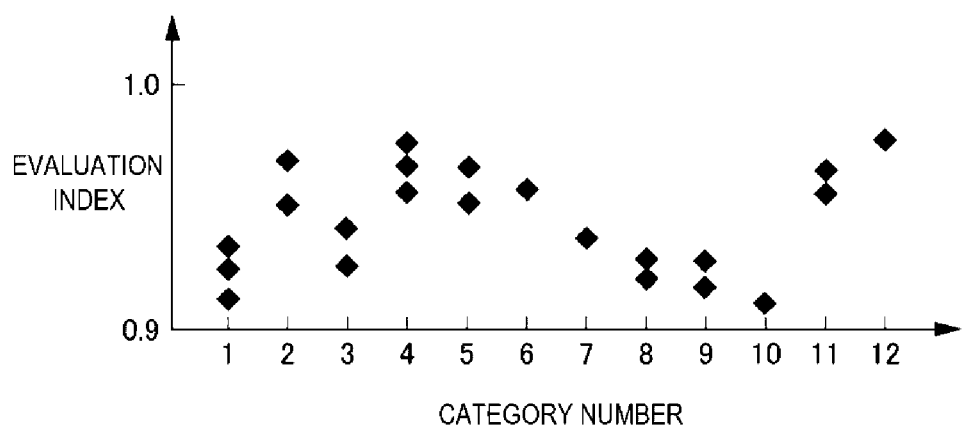

[FIG. 9]
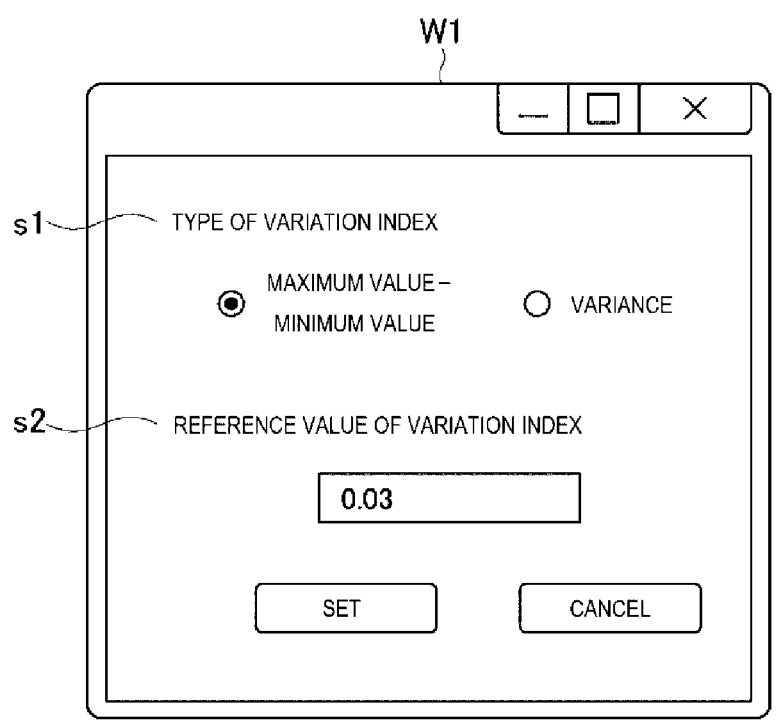

[FIG. 10]

| CATEGORY NUMBER | NUMBER OF DATA | EVALUATION INDEX | |
|---|---|---|---|
| | | AVERAGE VALUE | VARIATION |
| 1 | 10 | 0.925 | 0.028 |
| 2 | 12 | 0.968 | 0.025 |
| 3 | 23 | 0.936 | 0.018 |
| 4 | 12 | 0.975 | 0.025 |
| 5 | 8 | 0.972 | 0.018 |
| 6 | 25 | 0.952 | 0.021 |
| : | : | : | : |

[FIG. 11]
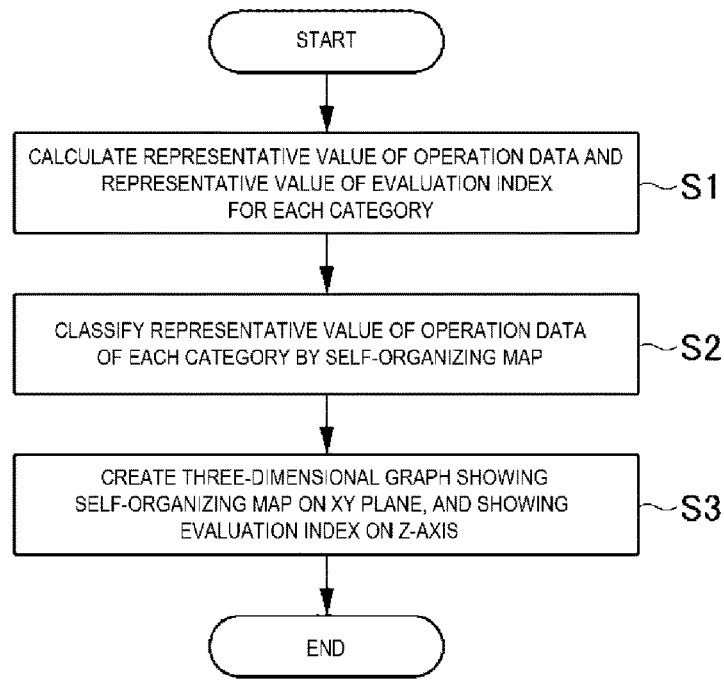
[FIG. 12]
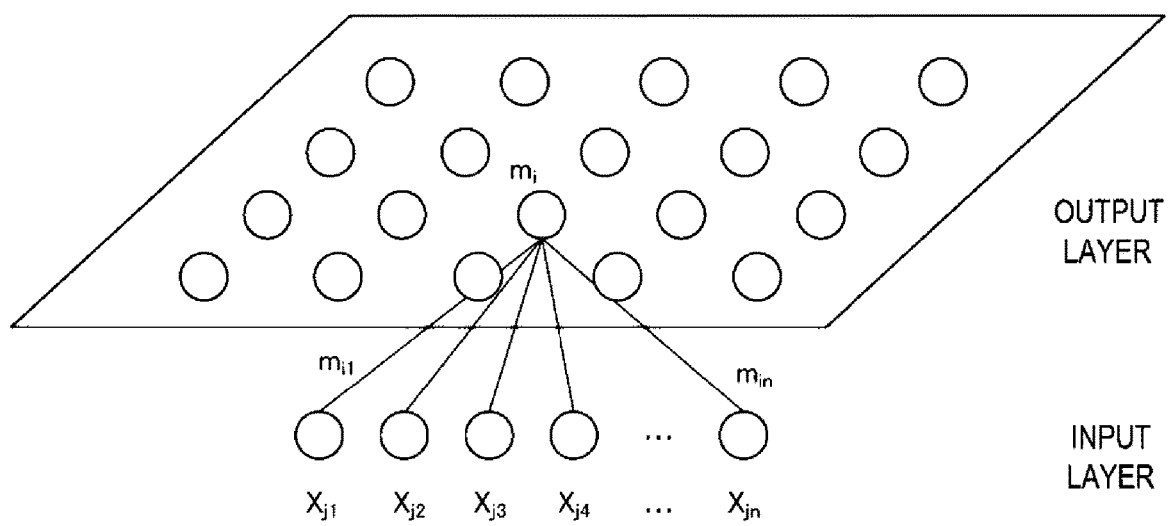

[FIG. 13]
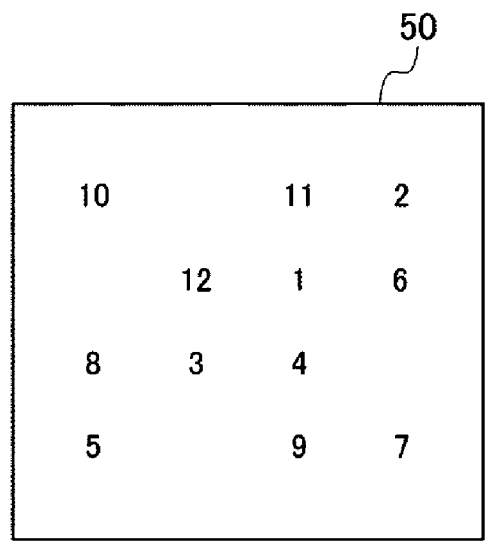
[FIG. 14]
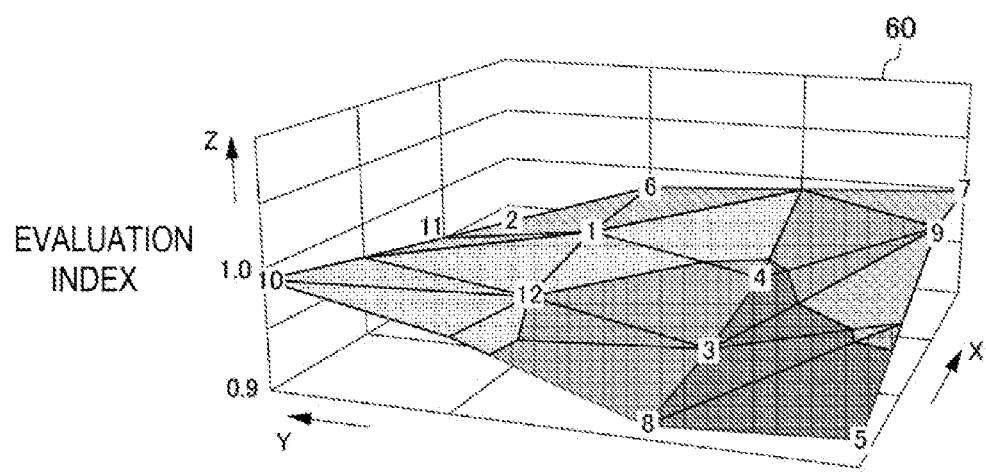

[FIG. 15]
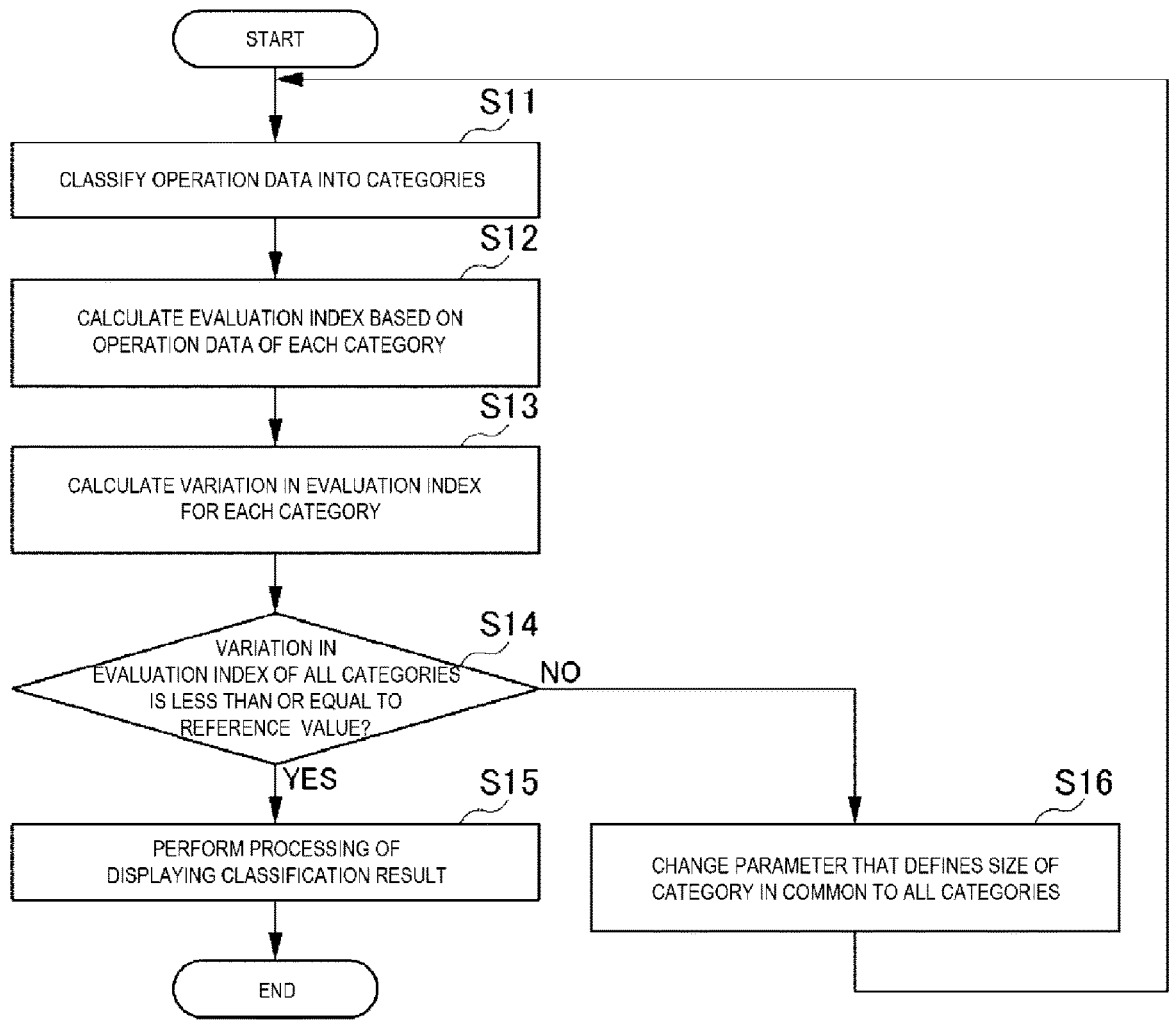

[FIG. 16]
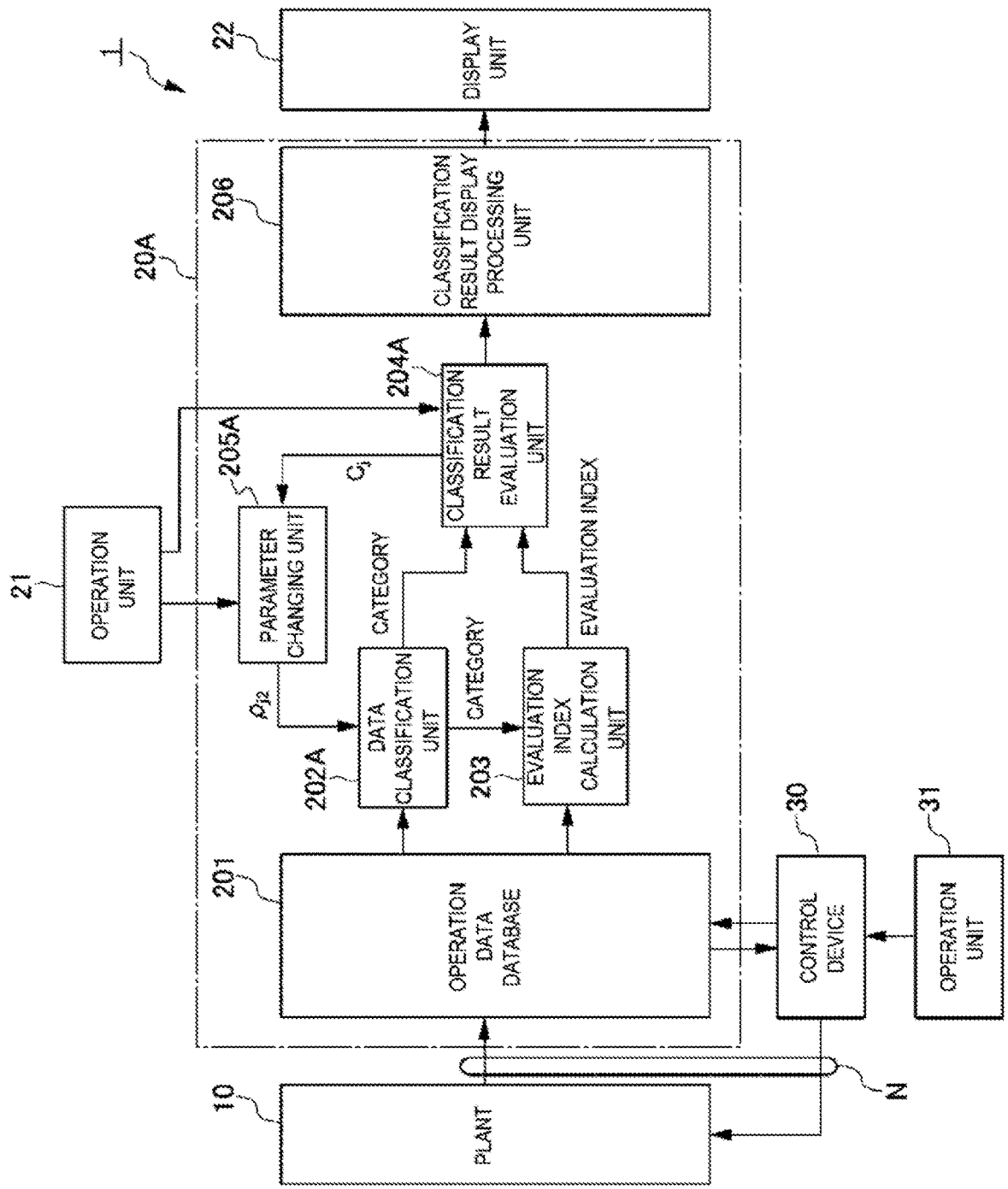

[FIG. 17]
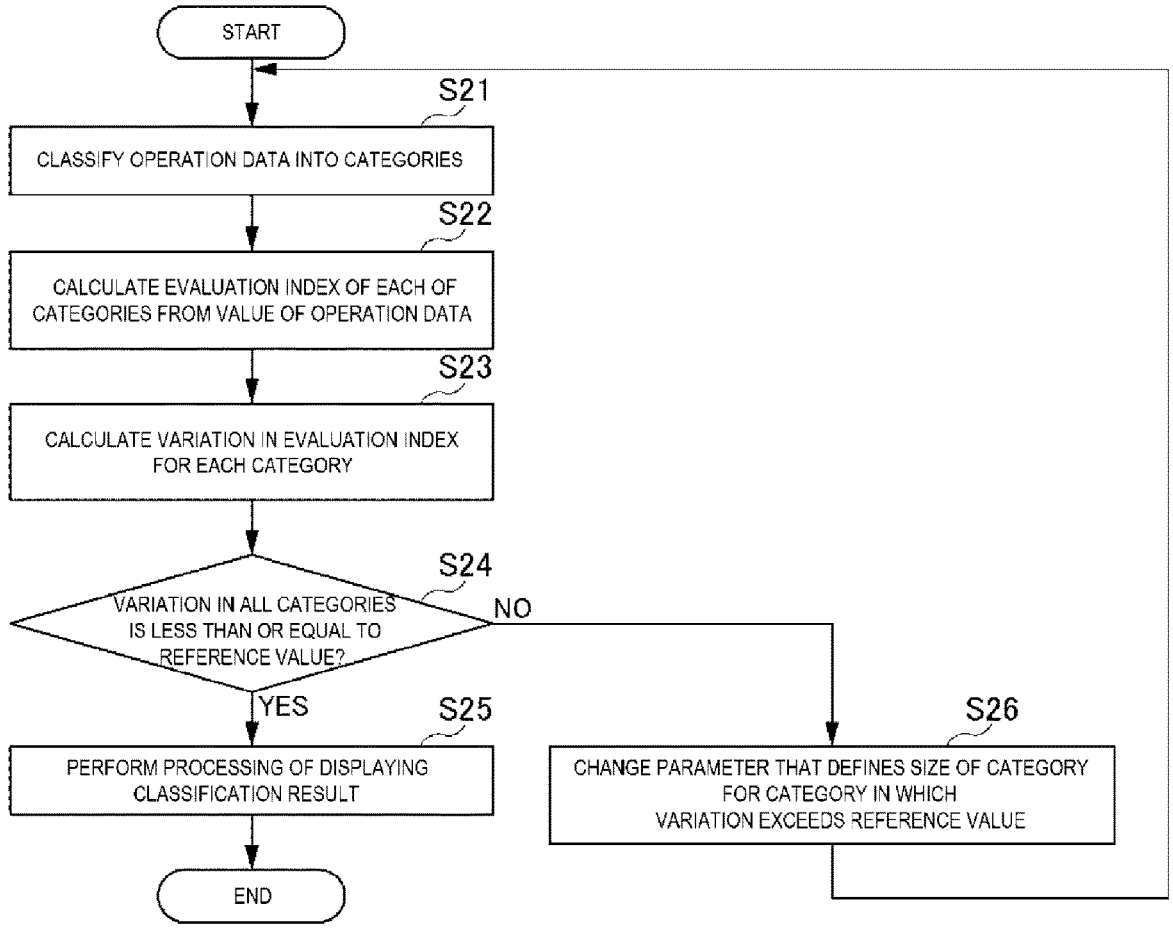

[FIG. 18]
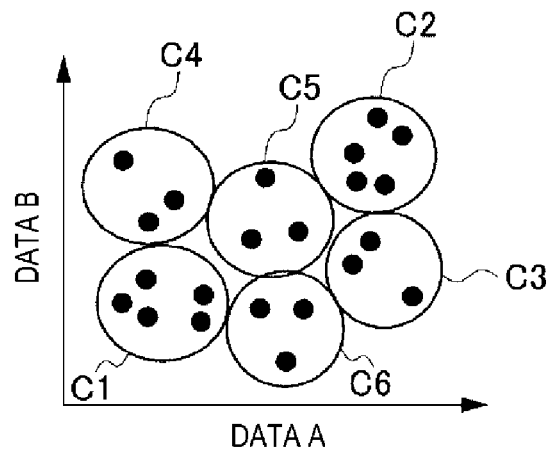
[FIG. 19]
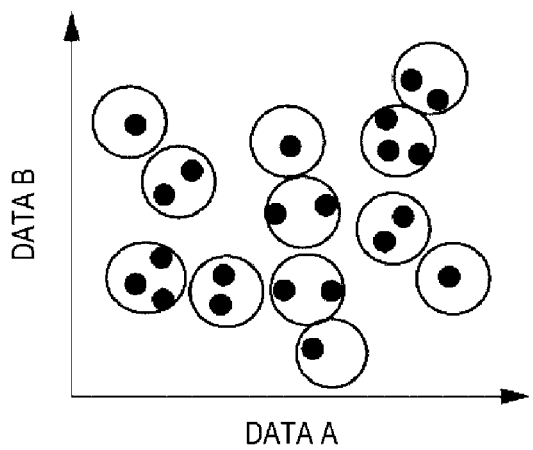

[FIG. 20]
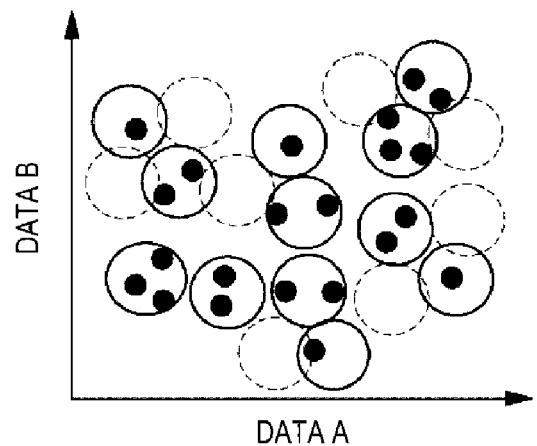
[FIG. 21]
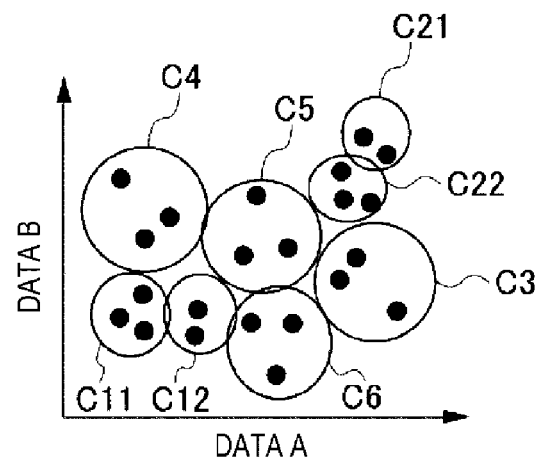
[FIG. 22]
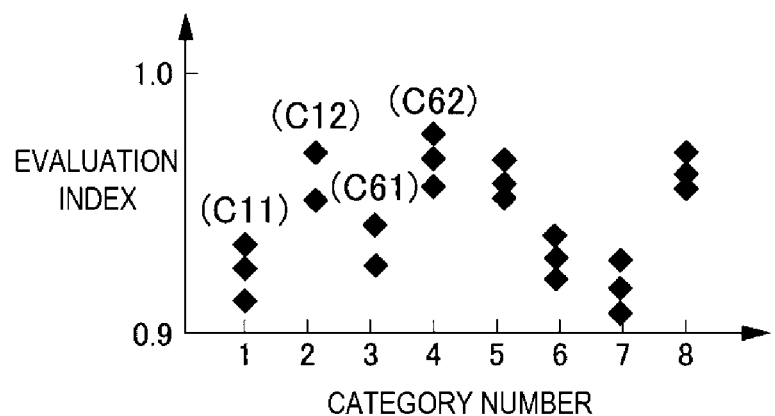

[FIG. 23]
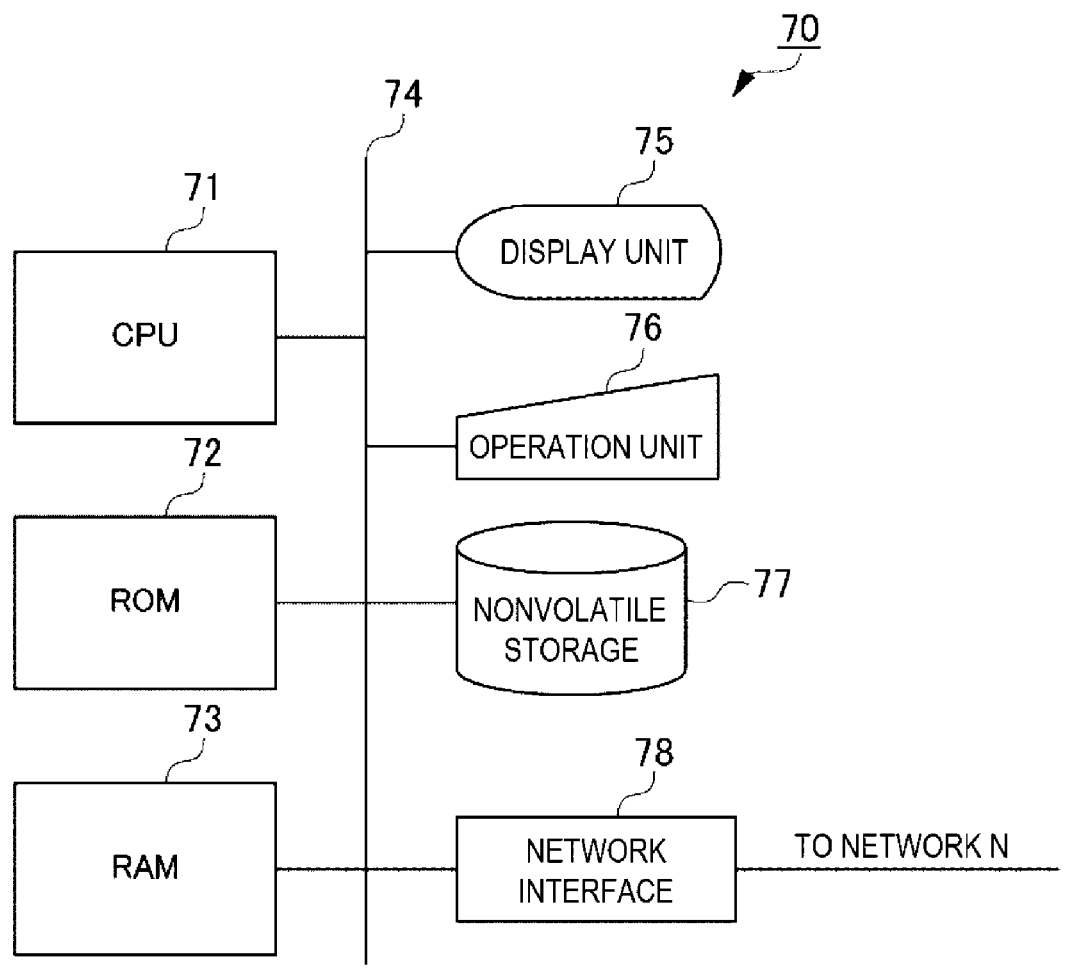

PLANT DATA CLASSIFICATION DEVICE, PLANT DATA DISPLAY PROCESSING DEVICE, AND PLANT CONTROL SYSTEM

CROSS-REFERENCE TO RELATED APPLICATIONS

This application is a U.S. National Stage entry of PCT Application No: PCT/JP2017/036227 filed Oct. 5, 2017, which claims priority to Japanese Patent Application No. 2017-043821, filed Mar. 8, 2017, the contents of which are incorporated herein by reference.

TECHNICAL FIELD

The present invention relates to a plant data classification device, a plant data display processing device, and a plant control system that display operation data such as temperature and pressure of plant equipment.

BACKGROUND ART

A power plant or a chemical plant is provided with many sensors such as a thermometer, a pressure gauge, a flowmeter to monitor and control the plant. Recent years have seen a growing demand for improving the operational efficiency of a plant or a yield of a product (plant equipment, machines constituting the plant equipment, and the like) by utilizing measurement data of these sensors.

In order to improve an evaluation index (performance index) such as the operational efficiency of a plant or the yield of a product, it is necessary to model (visualize) a relationship between a plant state and the evaluation index.

As a technique for realizing modeling, for example, Patent Literature 1 describes a method of modeling relationships among parameters by showing operation parameters on an X-axis, condition parameters on a Y-axis and evaluation parameters on a Z-axis. Patent Literature 1 also describes a data display method of visualizing the relationships among the parameters.

When the number of equipment or machines constituting a plant increases, the number of measurement points of the plant is very large. A data clustering technique is used as a method of classifying data (multidimensional data) in such a large number of measurement points. For example, Patent Literature 2 describes an abnormality diagnosis method of classifying multidimensional operation data into a plurality of categories (hereinafter referred to as "ART categories") by using a clustering technique referred to as Adaptive Resonance Theory (ART). In the technique described in Patent Literature 2, when there is a plurality of teacher categories of data belonging to the ART category, at least one of a correction operation of a weight coefficient vector or a change operation of a vigilance parameter is performed, and input data is classified again.

PRIOR ART LITERATURE

Patent Literature

PTL 1: JP-A-2007-156881
PTL 2: JP-A-2010-237893

SUMMARY OF INVENTION

Technical Problem

However, it is difficult to visualize the relationships among these parameters in the technique described in Patent Literature 1 when the total number of items of the operation parameters and items of the condition parameters is three or more.

The technique described in Patent Literature 2 can classify multidimensional data without unnecessarily increasing the ART categories. However, Patent Literature 2 does not describe the modeling of a relationship between the plant state and the evaluation index.

In view of the above circumstances, it was desired to appropriately model a relationship between categories classifying states of the multidimensional operation data and an evaluation index of the plant.

Solution to Problem

A plant data classification device according to one aspect of the invention includes: an operation data database that stores plant operation data; a data classification unit that classifies multidimensional operation data acquired from the operation data database into categories according to similarity, and outputs the categories as classification results; and an evaluation index calculation unit that calculates evaluation indexes of the categories from a value of the operation data stored in the operation data database. The plant data classification device further includes a classification result evaluation unit that calculates a variation in an evaluation index of a category obtained by the evaluation index calculation unit for each category output from the data classification unit, and determines whether the variation in the evaluation index is less than or equal to a reference value; and a parameter changing unit that changes, when the classification result evaluation unit determines that the variation in the evaluation index exceeds the reference value, a value of a parameter that defines a size of a category of the data classification unit in a direction of decreasing the size of the category.

A plant data display processing device according to one aspect of the invention includes a classification result display processing unit in the plant data classification device. The classification result display processing unit calculates a representative value of operation data for each category from the operation data contained in each category, maps identification information of each category to two-dimensional space in accordance with similarity of the representative value of the operation data, and generates three-dimensional image data in which the mapped identification information of the category is shown on a plane including a first axis and a second axis and the evaluation index of the category calculated by the evaluation index calculation unit is shown on a third axis.

A plant control system according to one aspect of the invention includes, in the plant data display processing device, an operation unit that receives input operation to a plant and outputs an operation signal according to the input operation, and a control device that controls a plant based on the operation signal input from the operation unit.

Advantageous Effect

According to at least one aspect of the invention, the state of the multidimensional operation data can be classified into categories more reliably. Therefore, the relationship between the categories classifying the state of the multidimensional operation data and the evaluation index of the plant can be appropriately modeled.

Problems, configurations, and effects other than the above will be apparent with reference to descriptions of the following embodiments.

BRIEF DESCRIPTION OF DRAWINGS

FIG. 1 shows an example of a display mode that shows a relationship between a category number and an evaluation index (representative value).

FIG. 2 is a diagram in which evaluation indexes for each operation data in a category are superimposed in the example of a display mode that shows the relationship between the category number and the evaluation index (representative value) in FIG. 1.

FIG. 3 is a block diagram showing a configuration example of a plant control system including a data classification device according to a first embodiment of the invention.

FIG. 4 is a system diagram showing an example of a plant configuration.

FIG. 5 shows an example of operation data stored in an operation data database.

FIG. 6 is an illustrative diagram showing an outline of a classification method of operation data using Adaptive Resonance Theory (ART).

FIG. 7 shows an example of evaluation index data.

FIG. 8 shows an example of a display mode that shows a relationship between a category number and an evaluation index (representative value) based on a calculation result of a classification result evaluation unit according to the first embodiment of the invention.

FIG. 9 is an illustrative diagram showing an example of a setting screen related to a variation index according to the first embodiment of the invention.

FIG. 10 is an illustrative diagram showing an example of a display screen that displays an average value and a variation in the evaluation index of the classification result according to the first embodiment of the invention.

FIG. 11 is a flowchart showing display processing of a classification result display processing unit according to the first embodiment of the invention.

FIG. 12 is an illustrative diagram of the Adaptive Resonance Theory.

FIG. 13 shows an example in which the category number is mapped to two-dimensional space according to the first embodiment of the invention.

FIG. 14 shows an example of a three-dimensional graph that shows a relationship between an evaluation index and the category number according to the first embodiment of the invention.

FIG. 15 is a flowchart showing an operation example of the data classification device according to the first embodiment of the invention.

FIG. 16 is a block diagram showing a configuration example of a plant control system including a data classification device according to a second embodiment of the invention.

FIG. 17 is a flowchart showing an operation example of the data classification device according to the second embodiment of the invention.

FIG. 18 is an illustrative diagram showing a classification result of the operation data according to the first embodiment of the invention.

FIG. 19 is an illustrative diagram showing a reclassification result of the operation data according to the first embodiment of the invention.

FIG. 20 is an illustrative diagram showing a problem of the classification result according to the first embodiment of the invention.

FIG. 21 is an illustrative diagram showing a reclassification result of operation data according to the second embodiment of the invention.

FIG. 22 is an illustrative diagram showing an example of a relationship between a category number and an evaluation index based on the classification result in FIG. 21.

FIG. 23 is a block diagram showing an example of a hardware configuration of devices of the plant according to the first embodiment and the second embodiment.

DESCRIPTION OF EMBODIMENTS

Hereinafter, embodiments of the invention will be described with reference to the accompanying drawings. Configuration elements having the same function or configuration in the drawings are denoted by the same reference numerals, and redundant descriptions thereof are omitted.

[Research]

First, the inventors considered a method of visualizing a relationship between a plant state (category number) and an evaluation index by applying the technique described in Patent Literature 2.

FIG. 1 shows an example of a display mode showing a relationship between a category number as a plant state and an evaluation index (representative value).

As shown in FIG. 1, the relationship between the plant state (category number) and the evaluation index can be visualized by taking the category number on a horizontal axis and a representative value (for example, an average value) of the evaluation index for each category based on operation data contained in each category on a vertical axis.

In addition, merely by using the technique disclosed in Patent Literature 2, the accuracy of modeling the plant state and the evaluation index may decrease depending on a condition. This is a case where the variation in the evaluation index based on operation data classified into categories is large. FIG. 2 shows an example thereof.

FIG. 2 is a diagram in which evaluation indexes for each operation data in a category are superimposed in the example of a display mode that shows the relationship between the category number and the evaluation index (representative value).

Data plotted with a rhombus in FIG. 2 indicates an evaluation index based on the operation data classified into each category. For example, it can be seen that the evaluation index based on the operation data classified into category number 1 has a very large variation as compared with a case of category numbers 3, 4, and the like. In this manner, when the variation in the evaluation index is large, a relationship between the category number and the evaluation index cannot be appropriately modeled.

Therefore, the inventors have made a configuration described below as a result of repeated studies on a method of appropriately modeling the relationship between the category classifying the state of multidimensional operation data and the evaluation index of the plant.

1. First Embodiment

[Overall Configuration of Plant Control Device]

FIG. 3 is a block diagram showing a configuration example of a plant control system including a data classification device according to a first embodiment.

As shown in FIG. 3, a plant control system 1 according to the first embodiment includes a data classification device 20 (an example of a plant data classification device and a plant data display processing device) which performs classification processing of operation data of a plant 10 and display processing of the classification result, a display unit 22, a control device 30, and an operation unit 31.

The data classification device 20 includes an operation data database 201, a data classification unit 202, an evaluation index calculation unit 203, a classification result evaluation unit 204, a parameter changing unit 205, and a classification result display processing unit 206.

The operation data database 201 stores time series data of measurement data such as temperature, pressure, and flow rate of equipment or machines constituting the plant 10. The measurement data is input via an input interface (not shown). In addition, the operation data database 201 stores time series data of operation amount data such as a valve opening degree and control setting value data input from the control device 30. Hereinafter, the measurement data, the operation amount data, and the setting value data are collectively referred to as "operation data". Measurement data may also be referred to as operation data.

The data classification unit 202 classifies multidimensional operation data acquired from the operation data database 201 into categories according to similarity by using a clustering technique and outputs the categories as the classification result to the evaluation index calculation unit 203 and the classification result evaluation unit 204. In the present embodiment, the Adaptive Resonance Theory (hereinafter referred to as "ART") is used as an example.

The evaluation index calculation unit 203 calculates an evaluation index of each category classified by the data classification unit 202 from a value of the operation data stored in the operation data database 201. In the present embodiment, a yield of a product is calculated as one of the evaluation indexes.

The classification result evaluation unit 204 uses category information of the operation data classified by the data classification unit 202 and the evaluation index obtained by the evaluation index calculation unit 203 to calculate a variation in the evaluation index based on the operation data classified into each category. The classification result evaluation unit 204 then determines whether the variation in the evaluation index is equal to or less than a reference value, and outputs a determination result to the parameter changing unit 205. If all the obtained variations in the categories are equal to or less than the reference value, the classification result display processing unit 206 performs display processing. On the other hand, when there is a variation exceeding the reference value, the classification result evaluation unit 204 notifies the parameter changing unit 205 of the variation. In the present embodiment, a value obtained by subtracting a minimum value from a maximum value of the evaluation index based on the operation data classified into each category as an example is used as an index of the variation.

The parameter changing unit 205 changes a value of a parameter that defines the size of the category of the data classification unit 202 when it is determined in the classification result evaluation unit 204 that the variation is not equal to or less than the reference value. In the present embodiment, the Adaptive Resonance Theory (ART) is used as an example for category classification of operation data, and a vigilance parameter, which is a parameter of ART, is increased to reduce the size of an ART category.

When the value of the parameter is changed by the parameter changing unit 205, the data classification unit 202 reclassifies the operation data into categories using the changed parameter. Next, the evaluation index calculation unit 203 recalculates the evaluation index of the category based on the reclassified category. Then, the classification result evaluation unit 204 calculates the variation in the evaluation index of the category reobtained by the evaluation index calculation unit 203 and determines whether the variation in the evaluation index is less than or equal to the reference value.

The classification result display processing unit 206 calculates a representative value of the operation data for each category from the operation data contained in each classified category and maps information of each category (category identification information) to two-dimensional space in accordance with similarity of the representative value of the operation data. Then, the classification result display processing unit 206 generates (graphs) a three-dimensional graph in which information of mapped category is shown on a plane formed of a first axis (X-axis) and a second axis (Y-axis), and the representative value of the evaluation index calculated by the evaluation index calculation unit 203 is shown on a third axis (Z-axis).

The display unit 22 displays image data on a screen. The image data is generated by the classification result display processing unit 206 and represents the relationship between the category number and the evaluation index.

An operation unit 21 changes a condition when the classification result is evaluated in the classification result evaluation unit 204 based on the operation content of a surveillance staff. Further, the operation unit 21 adjusts a step width when the parameter changing unit 205 changes the parameter (for example, a vigilance parameter) based on the operation content of the surveillance staff or directly inputs the value of the parameter.

The control device 30 monitors and controls the plant 10 based on operation data of the plant 10 stored in the operation data database 201. In addition, the control device 30 controls the plant 10 in accordance with an operation signal input from the operation unit 31.

The operation unit 31 receives an input operation of surveillance staff and inputs an operation signal according to the input operation to the control device 30.

Hereinafter, the first embodiment of the invention will be described in detail.

(Example of System Diagram)

FIG. 4 is a system diagram showing an example of a plant configuration.

Hereinafter, a chemical plant will be described as an example of the plant 10. FIG. 4 is an example of a system diagram of a chemical plant displayed on a screen of the display unit 22. The system diagram is, for example, an electronic file created by CAD software for system diagram creation, and shows machines, connection piping, and a major measurement machine therein. The system diagram is also referred to as Piping and Instrument Flow Diagram (P & ID). The system diagram shows information on machines (reactors R1 to R4 in FIG. 4), piping connecting the machines, and a measurement instrument. In FIG. 4, the measurement instrument is provided with a tag such as F1, P1, and T1. In the present embodiment, F indicates a flow meter, P indicates a pressure gauge, and T indicates a thermometer. A system shown in FIG. 3 is provided with 28 measurement instruments. Although FIG. 4 illustrates the chemical plant, a power plant, a pharmaceutical plant, and the like may be used.

(Example of Operation Data)

FIG. 5 shows an example of operation data stored in the operation data database.

Operation data 201a is time series data in which values of a flow rate, pressure, temperature at each time point are stored. In the example of FIG. 5, measurement data measured at each site of the system diagram (FIG. 4) of the plant 10 such as a first reactor inlet flow rate and a first reactor inlet pressure are stored, for example, at intervals of one minute.

The data classification unit 202 classifies, by using a data clustering technique, multidimensional operation data acquired from the operation data database 201 into categories according to similarity. Further, the data classification unit 202 outputs a classification result (a category number in the present embodiment) to the evaluation index calculation unit 203 and the classification result display processing unit 206. Several techniques have been proposed as the data clustering technique, and the Adaptive Resonance Theory (ART) was used in the present embodiment. An ART network (ART module) outputs an ART category j (for example, j is a natural number) when input data a is input. However, a classification method is not limited to ART, and other data clustering techniques may be used as long as the size of the corresponding category can be changed by adjusting the parameter for each category.

(Classification Method of Operation Data)

FIG. 6 shows an outline of a classification method of operation data using the Adaptive Resonance Theory (ART). A horizontal axis in an upper part of FIG. 6 indicates time points, and a vertical axis indicates values of the operation data. In addition, a horizontal axis in a lower part of FIG. 6 indicates time points, and a vertical axis indicates category numbers.

ART is a model that simulates the pattern recognition algorithm of human and can classify multidimensional data into a plurality of categories in accordance with similarity thereof. The content of ART is described in known literature or the like, and thus detailed descriptions thereof will be omitted and only the data classification method using ART will be described with reference to FIG. 6. An example of the data classification method using ART is described, for example, in JP-A-2005-258649.

In general, operation data to be input to the ART is data of four dimensions or more. However, it is considered herein to simplify the data and classify two-dimensional time series data (data 1 and data 2) shown in the upper part of FIG. 6. Data at each time point among the time series data is set as two-dimensional data that is the data 1 and the data 2.

When the two-dimensional data is input to the data classification unit 202 (ART), data of a region 1 where values of the data 1 are larger than values of the data 2 is, for example, classified into a certain category (category 1) (lower part in FIG. 6). In addition, data of a region 2 is classified as another category (category 2) since the relationship between the data 1 and the data 2 in the data of region 2 is different from that in the data of region 1. Similarly, data of a region 3 and a region 4 is classified as different categories, respectively. In the present embodiment, data of 28 items shown in FIG. 5 was classified by ART as input items.

A category is identified by a number (numeral) in the present embodiment. Alternatively, the category may be identified by using several symbols. That is, the number is an example of identification information of the category. In addition, a shape such as a circle (sphere) surrounding the number shows a position of the category and is information through which the category thereof can be distinguished from another category, so that the shape is contained in the identification information in a broad sense.

The evaluation index calculation unit 203 calculates an evaluation index of the plant 10 from a value of operation data stored in the operation data database 201. In the present embodiment, a yield of a product (a system in FIG. 4) was calculated as the evaluation index of the plant 10. Specifically, among the operation data 201a shown in FIG. 5, values of the first reactor inlet flow rate and a fourth reactor outlet flow rate are applied to Equation (1). The first reactor inlet flow rate is an inlet flow rate of the reactor R1 measured by a flow meter F1, and the fourth reactor outlet flow rate is an outlet flow rate of the reactor R4 measured by a flow meter F12.

$$\text{yield of product} = K \times (\text{value of flowmeter } F12)/(\text{value of flow meter } F1) \quad (1)$$

Here, K is a coefficient calculated from a theoretical formula, and the yield of the product is 100% in an ideal operation state.

(Example of Evaluation Index Data)

FIG. 7 shows an example of evaluation index data. In evaluation index data 203a shown in FIG. 7, the evaluation index (yield) is calculated and recorded at intervals of several minutes (1 minute in the figure), for example, corresponding to acquisition timing of the operation data 201a in FIG. 5.

[Classification Result Evaluation Unit]

The classification result evaluation unit 204 will be described. First, the classification result evaluation unit 204 calculates the variation in a plurality of evaluation indexes obtained by the evaluation index calculation unit 203 for each category classified by the data classification unit 202. In the present embodiment, a value (range) obtained by subtracting a minimum value from a maximum value of a plurality of evaluation indexes or variance is used as an index of variation and either of them can be selected. In a case where a value obtained by subtracting the minimum value from the maximum value is used, for example, when the maximum value of the evaluation index based on the operation data classified into category 1 is 0.98 and the minimum value thereof is 0.97, the variation of the category 1 is 0.01.

Next, the classification result evaluation unit 204 determines whether the variation in the evaluation index of each category obtained in this way is appropriate. In the present embodiment, when the variation in the evaluation indexes of all categories is less than or equal to the reference value, it is determined that the variation is appropriate, and processing of the classification result display processing unit 206 is performed. When there is a category in which the variation in the evaluation index exceeds the reference value, it is determined that the variation is not appropriate, and the parameter is changed by the parameter changing unit 205.

The parameter changing unit 205 changes a value of a vigilance parameter $\rho$, which is a parameter that defines the size of the ART category, from a current value $\rho_1$ to $\rho_2$. In the present embodiment, a value of the parameter is changed in accordance with Equation (2).

$$\rho_2 = \rho_1 + \Delta\rho \quad (2)$$

As described above, the variation in the evaluation index based on operation data contained in the same category becomes smaller by changing the vigilance parameter $\rho$ and reclassifying the operation data by the data classification unit 202. Finally, the variation in the evaluation index of all categories is equal to or less than the reference value. An example of the results classified in this way is shown in FIG. 8.

FIG. 8 shows an example of a display mode that shows a relationship between a category number and an evaluation index (representative value) based on a calculation result of the classification result evaluation unit 204.

FIG. 8 shows a result of classifying the same operation data as in FIG. 2 with a larger vigilance parameter. As a result, the number of categories is increased from 6 to 12, and variation in the evaluation index of each category is reduced. Categories 1 and 2 in FIG. 8 are obtained by dividing the category 1 in FIG. 2 into two categories. Similarly, categories 3 and 4 correspond to category 2 in FIG. 2, categories 5 and 6 correspond to category 3 in FIG. 2, categories 7 and 8 correspond to category 4 in FIG. 2, categories 9 and 10 correspond to category 5 in FIG. 2, and categories 11 and 12 correspond to category 6 in FIG. 2. If the classification shown in this figure is possible, it is considered that a relationship between a category and an evaluation index can be appropriately modeled.

Since there is a limitation that the vigilance parameter is smaller than 1 ($\rho<1$), the maximum value of the vigilance parameter $\rho$ is specified and the parameter changing unit 205 changes the vigilance parameter so that $\rho$ does not become 1 or more. Further, in the present embodiment, although $\Delta\rho$, which is a step width (increase width) at the time of change, is a fixed value, $\Delta\rho$ may be variable. For example, $\Delta\rho$ may be increased when a deviation between an evaluation index variation value and a reference value is large, and $\Delta\rho$ may be reduced when the deviation is small. Surveillance staff changes $\Delta\rho$ by operating the operation unit 21.

Selection of an index of the variation in the evaluation index as a difference value between the maximum value and the minimum value of the evaluation index or as a variance as well as setting of a reference value thereof is set by a setting screen shown in FIG. 9. In addition, an average value and a variation in the evaluation index of a classification result can be confirmed on a display screen in FIG. 10.

FIG. 9 shows an example of a setting screen related to a variation index.

In a setting unit s1 for a type of variation index on a setting screen W1, the surveillance staff can use the operation unit 21 to select "maximum value-minimum value" or "variance" by a radio button. Further, in a setting unit s2 of the reference value of the variation index, the surveillance staff can use the operation unit 21 to input an arbitrary reference value.

FIG. 10 shows an example of a display screen that displays an average value of and a variation in the evaluation index of the classification result.

On a display screen W2 shown in FIG. 10, items of "category number", "number of data", "average value of evaluation index", and "variation in evaluation index" are displayed. The surveillance staff can visually recognize the average value of and the variation in the evaluation index for each of the categories.

[Processing of Classification Result Display Processing Unit]

The classification result display processing unit 206 graphs the relationship between the category number and the evaluation index based on the operation data of the plant 10.

FIG. 11 is a flowchart showing display processing (graphing) of the classification result display processing unit 206.

First, in step S1, the classification result display processing unit 206 calculates, based on the operation data contained in each of the categories classified by the data classification unit 202, a representative value of the operation data and a representative value of the evaluation index for each of the categories. That is, the classification result display processing unit 206 calculates a representative value of the operation data of each item contained in each of the categories, and calculates an evaluation value based on the operation data thereof.

The operation data used in the present embodiment is, for example, data sampled from 28 items (measurement instrument) shown in FIG. 4 as an example. For example, assuming that data contained in the category 1 has 100 points (100 sampling points), an average value of 100 points of data is calculated for each item such as the first reactor inlet flow rate measured by the flow meter F1 and the first reactor inlet pressure measured by the pressure gauge P1.

In addition, the evaluation index is the yield of a product calculated by Equation (1), and an average value of 100 points for the evaluation index is similarly calculated.

The average value is adopted as the representative value in the present embodiment. Alternatively, other representative values such as a median value may be adopted.

Next, in step S2, the representative value of each item of the operation data contained in each of the categories is mapped to two-dimensional space in accordance with similarity of the representative value of each item of the operation data among categories calculated in step S1. In the following descriptions, mapping the representative value of each item of the operation data contained in each of the categories to the two-dimensional space may be referred to as "mapping the category number to two-dimension space".

In the present embodiment, a self-organizing map is used as a method of mapping a representative value of operation data. The self-organizing map, which is a kind of a neural network, is a method of mapping high-dimensional data to 1 to 3-dimensional space and is intended to reproduce a positional relationship in high-dimensional space in low-dimensional space.

[Outline of Self-Organizing Map]

Here, the outline of the self-organizing map will be described.

FIG. 12 shows a configuration when n-dimensional data ($X_{j1}$ to $X_{jn}$) is mapped to two-dimensional space. FIG. 12 is an illustrative diagram of the Adaptive Resonance Theory.

As shown in FIG. 12, the self-organizing map includes two layers: an input layer that inputs input data; and an output layer that maps the input data. The input data and the mapped data are also referred to as nodes. When the input data is mapped to the two-dimensional space, the nodes are arranged in two-dimensional space (for example, lattice shape) in the output layer. That is, positions of the nodes in the output layer correspond to positions of the categories, respectively.

In the present embodiment, each piece of the data $X_{j1}$ to $X_{jn}$ input to the input layer corresponds to the representative value of each item (FIG. 6) of the operation data for each of the categories. Nodes in the input layer are connected to nodes in the output layer via weighting coefficients $m_{i1}$ to $m_{in}$, respectively. FIG. 12 only shows a connection relationship between input data in the input layer and an i-th node in the output layer to avoid complication of the drawing.

Next, an algorithm of the self-organizing map will be described. In the self-organizing map, n-dimensional data is mapped to the output layer by the following three steps (1) to (3).

Step (1)

A weighting coefficient vector $m_c$ is searched out from weighting coefficient vectors $m_i$ of all the nodes in the output layer, and a node corresponding to $m_c$ is considered as a winner. The weighting coefficient vector $m_c$ is most similar to a weighting coefficient vector based on the weighting coefficients $m_{i1}$ to $m_{in}$ of the input data. The weighting coefficient vector is also referred to as "reference vector".

Step (2)

The weighting coefficient vector $m_i$ of the winner node and a node in proximity thereof are updated to be close to the weighting coefficient vector based on the weighting coefficients $m_{i1}$ to $m_{in}$ of the input data.

Step (3)

The steps (1) and (2) are repeated every time the input data is given.

An initial value of the weight coefficient vector min is determined by generating a random number. Thereafter, by steps (1) to (3), nodes arranged close to each other in the output layer have similar weighting coefficient vectors, and nodes arranged far away from each other in the output layer have different weighting coefficient vectors. Therefore, the n-dimensional data can be mapped to the two-dimensional space by arranging the data ($X_{j1}$ to $X_{jn}$) input to the input layer at a position of a node closest to the weighting coefficient vector of the output layer.

The present embodiment adopts the self-organizing map as a mapping method in the classification result display processing unit 206. Alternatively, the method of mapping multidimensional data is not limited to the self-organizing map, and other methods such as multidimensional scaling may be used. The multidimensional scaling is a method of arranging data having affinity in two-dimensional or three-dimensional space. The affinity of the data can be converted into similarity or a distance between objects to be classified. In the multidimensional scaling, similar objects to be classified are arranged close to each other, and objects to be classified that are not similar are arranged far away from each other.

[Example of Mapping to Two-Dimensional Space]

FIG. 13 shows an example in which the category number is mapped to two-dimensional space.

The number shown in two-dimensional space 50 in FIG. 13 is the category number, and the category number is mapped based on the representative value of each item of the operation data contained in each of the categories. Therefore, it can be seen from the drawing that, for example, a category 3 is close to a category 4 and a category 5, and is also close to a category 9. In addition, a category 7 and a category 8 are close in number. However, it can be seen that the category 7 is significantly separated from the category 8 in space (Euclidean Distance).

The description will now return to the flowchart in FIG. 11. In step S3, the classification result display processing unit 206 creates a three-dimensional graph, in which the two-dimensional category number mapped in step S2 is shown on an XY plane formed of an X-axis and a Y-axis, and the representative value of the evaluation index calculated by the evaluation index calculation unit 203 is shown on a Z-axis. An example of the created three-dimensional graph is shown in FIG. 14.

[Three-dimensional Display of Category Number and Evaluation Index]

FIG. 14 shows an example of a three-dimensional graph showing a relationship between the evaluation index and the category number.

An XY plane including an X-axis (first axis) and a Y-axis (second axis) shows an example of mapping the relationship between the similarity of categories shown in FIG. 10. The XY plane has 4×4 dots and the classified category is drawn on any one of the 16 dots in the present embodiment. However, the present embodiment is not limited thereto. The evaluation index on a Z-axis (third axis) is a yield of a product, and is a value between 0.9 and 1.0 in the present embodiment. For example, a correspondence between the representative value of the evaluation index and the category number according to the present embodiment is as follows. In the following descriptions, the representative value of the evaluation index of each of the categories may be referred to as "evaluation value".

Number 1: 0.97; Number 2: 0.93; Number 3: 0.92; Number 4: 0.94; Number 5: 0.92; Number 6: 0.98; Number 7: 1.00; Number 8: 0.91; Number 9: 1.00; Number 10: 0.99; Number 11: 0.96; Number 12: 0.96.

According to a three-dimensional graph 60 as shown in FIG. 14, relationships among categories (plant state) are clarified, and a position of a category having a high evaluation index can be visualized. For example, when the category of current operation data is number 4, the surveillance staff can intuitively understand that the evaluation index increases when the plant is operated to fall into a category 1, a category 6 or a category 9, and conversely, the evaluation index decreases when the state of the category 3 is approached.

In the three-dimensional graph 60 in FIG. 14, evaluation values of adjacent category numbers are consecutive (connected). Alternatively, representative values of the evaluation indexes may be discretely displayed according to positions of categories by using a columnar graph.

[Plant Control System Operation]

Next, an operation example of the plant control system 1 will be described.

FIG. 15 is a flowchart showing an operation example of the data classification device 20.

First, the data classification unit 202 classifies the multidimensional operation data received from the operation data database 201 into categories by ART (S11). Next, the evaluation index calculation unit 203 calculates an evaluation index based on the operation data classified into the categories (S12). Next, the classification result evaluation unit 204 calculates the variation in the evaluation index for the categories (S13).

Here, the classification result evaluation unit 204 determines whether or not the variation in the evaluation index of all the categories is less than or equal to the reference value (S14). When the variation in all categories is equal to or less than the reference value (YES in S14), the classification result display processing unit 206 performs processing of displaying the classification result (S15). When the processing of step S15 ends, a series of processing of the flowchart is ended.

On the other hand, when there is a category in which the variation in the evaluation index exceeds the reference value (NO in S14), the parameter changing unit 205 changes the parameter (vigilance parameter) that defines the size of the category in common to all categories (S16). In this case, the parameter changing unit 205 increases the vigilance parameter according to Equation (2). Further, after the processing of step S16, the processing proceeds to step S11, and the classification of the operation data, the calculation of the evaluation index, and the calculation and determination of the variation in the evaluation index are performed again.

Effects of First Embodiment

According to the data classification device 20 according to the first embodiment having the above-described configurations, input operation data is classified, and the variation in the evaluation index based on the operation data used for the classification for each of categories is evaluated. When there is a category in which the variation in the evaluation index exceeds the reference value, the data classification device 20 changes the parameter that defines the size of the category of the data classification unit 202 and reclassifies the operation data. Accordingly, the state of the multidimensional operation data can be classified into categories more reliably, and thus the relationship between the category classifying the state of the multidimensional operation data and the evaluation index of the plant can be appropriately modeled. That is, the relationship between the categories of multidimensional operation data of the plant 10 is clarified. The relationship between the category and the evaluation index can be combined and displayed in a two-dimensional space or a three-dimensional space. Therefore, the plant control system 1 according to the first embodiment can more appropriately support the operation for improving the evaluation index of the plant 10 by the surveillance staff. As a result, the operation efficiency of the plant 10 can be improved.

2. Second Embodiment

Next, a second embodiment of the invention will be described. The second embodiment is configured to change a parameter that defines the size of a category in category units.

FIG. 16 is a block diagram showing a configuration example of a plant control system including a data classification device according to the second embodiment.

A data classification device 20A according to the second embodiment differs from the data classification device according to the first embodiment in a first point that a clustering technique used in a data classification unit 202A can determine the size of a category for each of categories. A second point is that a classification result evaluation unit 204A and a parameter changing unit 205A determine the necessity of changing the parameter and change the parameter for each of categories.

Hereinafter, differences between the second embodiment and the first embodiment will be described in detail.

In the second embodiment, the data classification unit 202A uses an ART model that can set a vigilance parameter $\rho$ indicating the degree of detail of classification for each category. That is, the ART model used in the first embodiment has the same vigilance parameter $\rho$ for all categories. However, in the ART model used in the second embodiment, one vigilance parameter $\rho_j$ is assigned to a category j (for example, j is a natural number). Although an initial value of $\rho_j$ is set to the same value, the vigilance parameter $\rho_j$ can be adjusted individually when changing the vigilance parameter in the parameter changing unit 205A.

The classification result evaluation unit 204A according to the second embodiment determines whether or not the variation in the evaluation index is appropriate for each category. A method of evaluating the appropriateness of a variation is the same as that of the first embodiment. The variation in the evaluation index is calculated based on operation data classified into the category j, and the appropriateness is evaluated by comparing the variation in the evaluation index set in the setting screen W1 in FIG. 9 with a reference value. Here, in a category in which the variation in the evaluation index exceeds the reference value, a classification result is determined to be inappropriate. The classification result evaluation unit 204A notifies the parameter changing unit 205A of information (Cj) of the category in which the variation in the evaluation index exceeds the reference value.

The parameter changing unit 205A changes the vigilance parameter $\rho_j$ only for the category j in which the classification result is determined to be inappropriate. A method of changing the vigilance parameter $\rho_j$ is the same as that of the first embodiment, and a current value $\rho_{j1}$ is changed to a value $\rho_{j2}$. In the present embodiment, a value of the parameter is changed according to Equation (3). In the present embodiment, $\Delta\rho$ is a fixed value, but may be variable.

$$\rho_{j2} = \rho_{j1} + \Delta\rho \quad (3)$$

FIG. 17 is a flowchart showing an operation example of the data classification device 20A.

The processing of steps S21 to S25 in FIG. 17 are the same as the processing of steps S11 to S15 in FIG. 15, and thus the description thereof is omitted.

In step S24, when there is a category in which the variation in the evaluation index exceeds the reference value (NO in S24), the parameter changing unit 205A changes a parameter (vigilance parameter) that defines the size of the category for the corresponding category (S26). After the processing of step S26, the processing proceeds to step S21, and the data classification unit 202A reclassifies all the operation data based on the parameter (vigilance parameter) set for each of categories. Thereafter, the data classification device 20A performs calculation of the evaluation index and calculation and determination of variation in the evaluation index again based on a reclassification result of the data classification unit 202A.

Effects of Second Embodiment

Next, effects of the second embodiment will be described in comparison with the first embodiment. Here, in order to make the description easy to understand, operation data is assumed to be two-dimensional data of data A and data B.

First, a result classified by the data classification device 20 according to the first embodiment will be described. FIG. 18 is an illustrative diagram showing a classification result of the operation data according to the first embodiment, and shows the classified operation data in which the vigilance parameter $\rho$ is an initial value. Here, data is classified into six categories C1 to C6. Evaluation indexes of the categories are the content shown in FIG. 2, and variations in the data of category 1 and category 2 are large.

FIG. 19 is an illustrative diagram showing a reclassification result of the operation data according to the first embodiment. In the first embodiment, sizes of all categories are reduced by increasing the vigilance parameter $\rho$ and reclassifying the data. As shown in FIG. 19, the data is finely classified. As a result, the variation in the evaluation index of the categories is equal to or less than the reference value as shown in FIG. 8. However, in FIG. 19, a data region not belonging to the category is increased as compared with FIG. 18.

FIG. 20 is an illustrative diagram showing a problem of the classification result according to the first embodiment. A corresponding data region is schematically shown by a dashed line, and the data classification unit 202 (FIG. 3) cannot determine the category when the data enters the region. The data classification device 20 of the plant control system 1 models the relationship between the state of the plant 10 and the evaluation index, and uses the relationship to determine what state the operation data of the plant 10 is in. Therefore, it is not preferable that the number of regions where the category cannot be determined such as the region indicated by the dashed line in FIG. 20 increases.

The situation is improved in the data classification device 20A according to the second embodiment. In the second embodiment, the classification result with the vigilance parameter $\rho_j$ in the initial value state is the same with that of the first embodiment, so that the classification state of the first data is as shown in FIG. 18, and the relationship between each category and the evaluation index is as shown in FIG. 2. However, in the second embodiment, only vigilance parameters $\rho_{11}$ of a category C1 and $\rho_{21}$ of a category C2 having a large variation in evaluation index are changed, and all data are reclassified. A classification result thereof is shown in FIG. 21.

FIG. 21 is an illustrative diagram showing a reclassification result of operation data according to the second embodiment.

As shown in FIG. 21, according to a reclassification method of the second embodiment, the data of the category C1 having a large variation in the evaluation index is classified into categories C11 and C12. Further, the data of the category C2 is classified into categories C21 and C22. An overall classification result is a mixture of large categories and small categories. Therefore, there is an effect that the region where the category cannot be determined is less than that in the first embodiment. Therefore, the data classification unit 202A can classify the input data into any category more reliably.

FIG. 22 is an illustrative diagram showing an example of a relationship between a category number and an evaluation index based on the classification result in FIG. 21. As shown in FIG. 22, the variation in the evaluation index of the data classified into categories is controlled to the reference value or less, and the relationship between the category number and the evaluation index can be appropriately modeled. That is, the data classification device 20A according to the second embodiment can control the variation to the reference value or less even if there is a variation in the evaluation index of an initially classified category, and is a more robust data classification device.

[Hardware Configuration of Devices]

FIG. 23 is a block diagram showing an example of a hardware configuration of devices of the plant according to the first embodiment and the second embodiment.

Here, a hardware configuration of a computer 70, which constitutes the data classification devices 20 and 20A and the control device 30 shown in the plant control system 1, will be described. Units of the computer 70 are selected according to functions and use purposes of devices.

The computer 70 includes a central processing unit (CPU) 71, a read only memory (ROM) 72, and a random access memory (RAM) 73, which are separately connected to a bus 74. Furthermore, the computer 70 includes a display unit 75, an operation unit 76, a nonvolatile storage 77, and a network interface 78.

The CPU 71 reads from the ROM 72 a program code of software that realizes functions according to the present embodiment and executes the program code. The computer 70 may include a processing device such as a microprocessing unit (MPU) instead of the CPU 71. Variables, parameters, or the like generated during arithmetic processing are temporarily written in the RAM 73.

The display unit 75 is, for example, a liquid crystal display monitor, and displays a result or the like of processing performed by the computer 70. The display unit 75 corresponds to the display unit 22 in FIG. 3. A keyboard, a mouse, a touch panel, or the like are used as the operation unit 76 so that the surveillance staff can perform predetermined operation input and instructions. In addition, the operation unit 76 may be an operation element such as an operation key or a button switch. The operation unit 76 corresponds to the operation unit 21 or the operation unit 31 in FIG. 3.

Examples of the nonvolatile storage 77 include a hard disk drive (HDD), a solid state drive (SSD), a flexible disk, an optical disk, a magneto-optical disk, a CD-ROM, a CD-R, a magnetic tape, a nonvolatile memory card, or the like. The nonvolatile storage 77 may record a program that causes the computer 70 to function in addition to an operating system (OS), various parameters or data. For example, the nonvolatile storage 77 may store data of the operation data database 201 and the evaluation index data 203a.

A network interface card (NIC) or the like is used as the network interface 58, and various data can be transmitted and received between devices via a network N such as LAN.

All or a part of the data display processing device 20 and the control device 30 may be constituted by a single computer.

3. Others

The invention is not limited to the above-described embodiments, and various other applications and modifications may be made without departing from the scope of the invention as set forth in the claims.

For example, although the above-described embodiments have described configurations of the device and the system in detail and specifically for easy understanding of the invention, the invention is not necessarily limited to those including all the configurations described above. A part of a configuration of a certain embodiment can be replaced with a configuration of other embodiments. A configuration of other embodiments may be added to a configuration of a certain embodiment. Other configurations may be added to, deleted from or replaced with a part of a configuration of each embodiment.

In addition, configurations, functions, processing units, processing methods, or the like may be achieved by hardware by designing a part or all of them with, for example, an integrated circuit. The configurations, functions or the like may be achieved by software by interpreting and executing a program for achieving the respective functions by a processor. Information such as a program, a table, and a file for achieving the functions can be stored in a recording device such as a memory, a hard disk and a solid state drive (SSD), or a recording medium such as an IC card, an SD card, and a DVD.

In addition, a control line and an information line are shown in consideration of necessity for description, and not all control lines and information lines are necessarily shown in the device. In practice, it may be considered that almost all the configurations are connected with each other.

In addition, in the present description, a processing step that describes time-series processing includes processing performed in time series according to a described order, as well as processing executed in parallel or individually (for example, parallel processing or processing by an object) which is not necessarily performed in time series.

REFERENCE SIGN LIST

1 . . . plant control system, 10 . . . plant, 20, 20A . . . data classification device, 30 . . . display unit, 40 . . . control device, 41 . . . operation unit, 50 . . . two-dimensional space, 60 . . . three-dimensional graph, 70 . . . computer, 71 . . . CPU, 72 . . . two-dimensional graph, 73 . . . three-dimensional graph, 81 . . . two-dimensional graph, 82 . . . two-dimensional graph, 91 . . . two-dimensional plane, 201 . . . operation data database, 201a . . . operation data, 202 . . . data classification unit, 203 . . . evaluation index calculation unit, 203a . . . evaluation index data, 204 . . . classification result display processing unit, 205, 205A . . . parameter changing unit, C1 to C6, C11, C12, C61, C62 . . . category

The invention claimed is:

1. A plant data classification device comprising:
an operation data database that stores plant operation data;
a data classification unit that classifies multidimensional operation data acquired from the operation data database into categories according to similarity, and outputs the categories as classification results;
an evaluation index calculation unit that calculates evaluation indexes of the categories from a value of the operation data stored in the operation data database;
a classification result evaluation unit that calculates a variation in an evaluation index of a category obtained by the evaluation index calculation unit for each category output from the data classification unit, and determines whether the variation in the evaluation index is less than or equal to a reference value; and
a parameter changing unit that changes, when the classification result evaluation unit determines that the variation in the evaluation index exceeds the reference value, a value of a parameter that defines a size of a category of the data classification unit to decrease the size of the category.

2. The plant data classification device according to claim 1, wherein, when the parameter changing unit changes the value of the parameter, the data classification unit reclassifies the operation data into categories using the changed parameter, the evaluation index calculation unit recalculates evaluation indexes of the categories based on the categories reclassified by the data classification unit, and the classification result evaluation unit calculates a variation in an evaluation index of a category reobtained by the evaluation index calculation unit and re-determines whether the variation in the evaluation index is less than or equal to the reference value.

3. The plant data classification device according to claim 1, wherein, for the category in which the variation in the evaluation index determined by the classification result evaluation unit exceeds the reference value, the parameter changing unit increases the value of the parameter of the category in the data classification unit to decrease the size of the category.

4. The plant data classification device according to claim 1, wherein the classification of the multidimensional operation data in the data classification unit is performed by using an adaptive resonance theory.

5. A plant data display processing device comprising:
an operation data database that stores plant operation data;
a data classification unit that classifies multidimensional operation data acquired from the operation data database into categories according to similarity, and outputs the categories as classification results;
an evaluation index calculation unit that calculates evaluation indexes of the categories from a value of the operation data stored in the operation data database;
a classification result evaluation unit that calculates a variation in an evaluation index of a category obtained by the evaluation index calculation unit for each category output from the data classification unit, and determines whether the variation in the evaluation index is less than or equal to a reference value;
a parameter changing unit that changes, when the classification result evaluation unit determines that the variation in the evaluation index exceeds the reference value, a value of a parameter that defines a size of a category of the data classification unit to decrease the size of the category; and
a classification result display processing unit that calculates a representative value of the operation data for each category from the operation data contained in each category, maps identification information of each category to two-dimensional space in accordance with similarity of the representative value of the operation data, and generates three-dimensional image data in which the mapped identification information of the category is shown on a plane including a first axis and a second axis and the evaluation index of the category calculated by the evaluation index calculation unit is shown on a third axis.

6. The plant data display processing device according to claim 5, wherein a method of mapping the identification information of the category by the classification result display processing unit is a self-organizing map or a multidimensional scaling method.

7. A plant control system comprising:
an operation data database that stores plant operation data;
a data classification unit that classifies multidimensional operation data acquired from the operation data database into categories according to similarity, and outputs the categories as classification results;
an evaluation index calculation unit that calculates evaluation indexes of the categories from a value of the operation data stored in the operation data database;
a classification result evaluation unit that calculates a variation in an evaluation index of the category obtained by the evaluation index calculation unit for each category output from the data classification unit, and determines whether the variation in the evaluation index is less than or equal to a reference value;
a parameter changing unit that changes, when the classification result evaluation unit determines that the variation in the evaluation index exceeds the reference value, a value of a parameter that defines a size of a category of the data classification unit to decrease the size of the category;
a classification result display processing unit that calculates a representative value of the operation data for each category from the operation data contained in each category, maps identification information of each category to two-dimensional space in accordance with similarity of the representative value of the operation data, and generates three-dimensional image data in which the mapped identification information of the category is shown on a plane including a first axis and a second axis and the evaluation index of the category calculated by the evaluation index calculation unit is shown on a third axis;
an operation unit that receives input operation to the plant and outputs an operation signal according to the input operation; and
a control device that controls the plant based on the operation signal input from the operation unit.

8. The plant data classification device according to claim 2, wherein, for the category in which the variation in the evaluation index determined by the classification result evaluation unit exceeds the reference value, the parameter changing unit increases the value of the parameter of the category in the data classification unit to decrease the size of the category.

\* \* \* \* \*